(12) United States Patent
Chen et al.

(10) Patent No.: US 8,286,151 B2
(45) Date of Patent: Oct. 9, 2012

(54) OVERLAY INSTRUCTION ACCESSING UNIT AND OVERLAY INSTRUCTION ACCESSING METHOD

(75) Inventors: Liang Chen, Shanghai (CN); Kuan Feng, Shanghai (CN); Wang Zheng, Cambridge (GB); Min Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 12/239,070

(22) Filed: Sep. 26, 2008

(65) Prior Publication Data

US 2009/0089507 A1 Apr. 2, 2009

(30) Foreign Application Priority Data

Sep. 29, 2007 (CN) .......................... 2007 1 0153203

(51) Int. Cl.
*G06F 3/45* (2006.01)
*G00F 15/00* (2006.01)

(52) U.S. Cl. ......................................... 717/143; 712/13
(58) Field of Classification Search .................. 717/128, 717/140–143; 712/13, 20–21, 24; 711/125
See application file for complete search history.

(56) References Cited

U.S. PATENT DOCUMENTS

| | | | |
|---|---|---|---|
| 5,018,154 A * | 5/1991 | Ohashi ........................ | 372/29.01 |
| 5,819,058 A | 10/1998 | Miller et al. | |
| 6,343,354 B1 * | 1/2002 | Breternitz et al. ............ | 711/201 |
| 6,408,382 B1 | 6/2002 | Pechanek et al. | |
| 6,691,305 B1 | 2/2004 | Henkel et al. | |
| 6,694,393 B1 | 2/2004 | Sutter | |
| 6,859,870 B1 | 2/2005 | Kim et al. | |
| 7,051,189 B2 | 5/2006 | Warnes | |
| 7,095,343 B2 | 8/2006 | Xie et al. | |
| 7,203,935 B2 | 4/2007 | Chakradhar et al. | |
| 7,590,832 B2 * | 9/2009 | Taniuchi ....................... | 712/300 |
| 2001/0013093 A1 * | 8/2001 | Banno et al. .................. | 712/210 |
| 2002/0169946 A1 * | 11/2002 | Budrovic et al. ............. | 712/209 |
| 2004/0111710 A1 * | 6/2004 | Chakradhar et al. .......... | 717/136 |
| 2005/0257028 A1 * | 11/2005 | Guffens et al. ................ | 712/24 |
| 2008/0250291 A1 * | 10/2008 | Yamada et al. ............... | 714/738 |

OTHER PUBLICATIONS

IEEE, "A Code Compression Scheme for Improving SoC Performance", E.G. Nikolova, et al, 2003, pp. 35-40.
IEEE, "Minimizing Memory Access Energy in Embedded System by Selective Instruction Compression", Luca Benini, et al., vol. 10, IEEE Transactions on Very Large Scale Integration (VLSI) Systems, Oct. 2002, pp. 521-531.
ESS'97, "Simulation in Low-Power Embedded Processor Design", Y. Yoshida et al, pp. 557-561.

* cited by examiner

*Primary Examiner* — Christopher B Shin
(74) *Attorney, Agent, or Firm* — David A. Mims. Jr.

(57) ABSTRACT

The present invention provides an overlay instruction accessing unit and method, and a method and apparatus for compressing and storing a program. The overlay instruction accessing unit is used to execute a program stored in a memory in the form of a plurality of compressed program segments, and compresses: a buffer; a processing unit for issuing an instruction reading request, reading an instruction from the buffer, and executing the instruction; and a decompressing unit for reading a requested compressed instruction segment from the memory in response to the instruction reading request of the processing unit, decompressing the compressed instruction segment, and storing the decompressed instruction segment in the buffer, wherein while the processing unit is executing the instruction segment, the decompressing unit reads, according to a storage address of a compressed program segment to be invoked in a header corresponding to the instruction segment, a corresponding compressed instruction segment from the memory, decompresses the compressed instruction segment, and stores the decompressed instruction segment in the buffer for later use by the processing unit.

24 Claims, 4 Drawing Sheets

OVERLAY INSTRUCTION ACCESSING UNIT AND OVERLAY INSTRUCTION ACCESSING METHOD

FIELD OF THE INVENTION

The present invention relates to an overlay instruction accessing unit and overlay instruction accessing method, as well as an apparatus and method for compressing and storing a program.

DESCRIPTION OF RELATED ART

With the increase of the scale of a System on Chip (SOC) and the development of application programs for the SOC, there is a need to integrate an embedded processor into the whole system in order to provide a high performance based on optimized instructions and structures. One of these generic architectures is to integrate digital signal processors (DSPs) into the system. Application programs built on this kind of platform can take advantage of the high performance provided by the DSPs to process digital media.

Integrating the processing units into the system improves the programmability of the SOC. However, the need for memories for storing instructions executed by these processing units increases correspondingly, because each of the processing units requires an individual instruction memory to store instructions to be executed. The problem is worse for a Single Program Multiple Data (SPMD) application in a multi-core architecture. In this case, since each processing unit of the multi-core processor needs to read and execute a same program, it is required to duplicate the program into an instruction memory for each processing unit so as to be executed by it, which increases the need for the instruction memories. Since the instruction memories are major sources of the cost of the system (especially for the SPMD model), integrating the processing units into the system correspondingly increases the cost of the system.

Thus, there is a need for a method of reducing the need for instruction memories.

SUMMARY OF THE INVENTION

The present invention is proposed in consideration of the above problem. An object of the present invention is to provide a method and system for compressing and storing a program, which can store a program to be executed by a processing unit in the form of compressed program segments and thereby reduce the need for memories for storing the program. Another object of the present invention is to provide an overlay instruction accessing unit and an overlay instruction accessing method which improve the program execution efficiency by performing the execution of an instruction segment currently decompressed and the decompression of a compressed instruction segment to be invoked next in an overlapped manner.

In particular, the present invention takes advantage of a compiler technique and an overlay accessing technique to solve the above problem. Specifically, the present invention partitions a program into a plurality of instruction segments using a compiler, compresses these instruction segments, and stores the compressed instruction segments in a memory, instead of storing the program directly in the memory as before. Further, since the program is stored in the form of compressed instruction segments, in order not to reduce the efficiency of executing the program by a processing unit, the present invention uses the overlay accessing technique, that is, while the processing unit is executing a current instruction segment, a decompressing unit decompresses a compressed instruction segment to be invoked next in advance and stores it in a buffer for subsequent use by the processing unit.

According to an aspect of the present invention, there is provided a method for compressing and storing a program, comprising the steps of: compiling the program; partitioning an instruction part of the compiled program into a plurality of instruction segments by means of a jump instruction in the program; compressing the plurality of instruction segments to obtain a plurality of compressed instruction segments; and storing the plurality of compressed instruction segments in a memory.

According to another aspect of the present invention, there is provided an apparatus for compressing and storing a program, comprising: a compiler for compiling the program, partitioning an instruction part of the compiled program into a plurality of instruction segments by means of a jump instruction in the program, and compressing the plurality of instruction segments to obtain a plurality of compressed instruction segments; and a memory for storing the plurality of compressed instruction segments.

According to another aspect of the present invention, there is provided an overlay instruction accessing method executed by an overlay instruction accessing unit comprising a processing unit, a buffer and a decompressing unit, for reading and executing a program stored in a memory in the form of a plurality of compressed program segments, wherein each of the compressed program segments includes a header at its beginning, a compressed instruction segment, and a jump instruction at its end, the header includes a storage address of a compressed program segment to be invoked next which is predicted based on invoking relationships in the program and a storage address of the compressed instruction segment, and the jump instruction includes a storage address of a compressed program segment to be invoked next which is specified when the program is programmed, the overlay instruction accessing method comprising the steps of: issuing an instruction reading request by the processing unit; reading a requested compressed instruction segment from the memory by the decompressing unit in response to the instruction reading request, decompressing the requested compressed instruction segment, and storing the decompressed instruction segment in the buffer for execution by the processing unit; and reading from the buffer and executing the instruction segment by the processing unit, and at the same time, according to a storage address of a compressed program segment to be invoked in a header corresponding to the instruction segment, reading the compressed program segment from the memory by the decompressing unit, decompressing a corresponding compressed instruction segment, and storing the decompressed instruction segment in the buffer.

According to another aspect of the present invention, there is provided an overlay instruction accessing unit for reading and executing a program stored in a memory in the form of a plurality of compressed program segments, wherein each of the compressed program segments includes a header at its beginning, a compressed instruction segment, and a jump instruction at its end, the header includes a storage address of a compressed program segment to be invoked next which is predicted based on invoking relationships in the program and a storage address of the compressed instruction segment, and the jump instruction includes a storage address of a compressed program segment to be invoked next which is specified when the program is programmed, the overlay instruction accessing unit comprising: a buffer; a processing unit for issuing an instruction reading request, reading an instruction from the buffer and executing the instruction; and a decompressing unit for reading a requested compressed instruction segment from the memory in response to the instruction reading request sent by the processing unit, decompressing the compressed instruction segment and storing the decompressed instruction segment in the buffer for execution by the processing unit, wherein while the processing unit is reading and executing the instruction segment from the buffer, the decompressing unit, according to a storage address of a compressed program segment to be invoked in a header corresponding to the instruction segment, reads the compressed program segment from the memory, decompresses a corresponding compressed instruction segment, and stores the decompressed instruction segment in the buffer.

The storage space required for storing a program is reduced by using the program compression method and apparatus according to the present invention to compress and store the program, and the security of the program is improved to some extent. Further, in the overlay instruction accessing method according to the present invention, the process for a processing unit to execute an instruction segment and the process for a decompressing unit to decompress an instruction segment to be invoked next are overlapped, and the decompressing unit may store an instruction segment to be needed by the processing unit in a buffer in advance, thus the latency of the processing unit is reduced and the execution efficiency is improved. For an SPMD application based on a multi-core processor, multiple processing units in the overlay instruction accessing unit according to the present invention can use one memory in common to store a program to be executed, thus the necessity of copying the program into an instruction memory for each of the processing units is avoided and the need for memories is further reduced.

BRIEF DESCRIPTION OF THE DRAWINGS

The above and other objects, features, and advantages of the present invention will become more apparent from the detailed description of embodiments of the present invention in conjunction with the attached drawings in which.

DETAILED DESCRIPTION OF THE INVENTION

Hereinafter, embodiments of the present invention are described with respect to the figures. It is to be understood that the embodiments described herein are only illustrative, but not to limit the scope of the present invention. It will be appreciated by those skilled in the art that various modifications and combinations can be made to the embodiments without departing from the scope of the present invention.

In general, a program is consisted of several instruction segments, and the instruction segments are linked to each other by jump instructions. When a processing unit executes the program, the processing unit executes these instruction segments sequentially and independently due to the data independence among the respective instruction segments, and jumps to a next instruction segment according to an encountered jump instruction after executing an instruction segment. The jump instructions comprise jump, call, and so on which indicate invoking relationships among the respective instruction segments in the program.

Based on this characteristic, if viewed from a sequence diagram, the invoking relationships among the respective instruction segments can be regarded as a list. For an H.264 decoder, for example, its sequence diagram is consisted of the steps of parsing, idct, intra/inter prediction, reconstruction, in-loop filtering, and so on. When processing a data stream, the H.264 decoder performs these steps sequentially on the data stream, and each of the steps is independent from the other steps when executed.

After the program is read, the program has to be compiled in order to convert the program into machine-readable codes. The compiled program is consisted of two parts, i.e. a data segment declaration part and an instruction part. The present invention is basically applied to the instruction part. As described above, the instruction part may be considered to be consisted of several instruction segments, and the respective instruction segments are linked to each other by jump instructions.

An apparatus 100 for compressing and storing a program according to the present invention is based on the above fact, which partitions an instruction part of a program to be executed by a processing unit into a plurality of independent instruction segments, and compress these instruction segments so as to reduce the storage space required for storing the program.

Hereinafter, the apparatus 100 for compressing and storing a program according to the present invention will be described in conjunction with FIG. 1.

Figure 1:
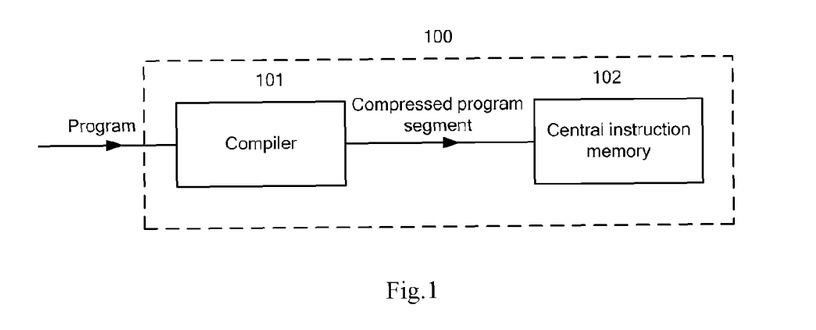
FIG. 1 is a block diagram of an apparatus for compressing and storing a program according to the present invention.

FIG. 1 shows a block diagram of the apparatus 100 for compressing and storing a program according to the present invention. As shown in FIG. 1, the apparatus 100 comprises a compiler 101 and a central instruction memory 102 connected to the compiler 101.

The compiler 101 can be implemented by a combination of hardware performing functions described in the present invention, and can also be implemented by well-known processors or controllers in conjunction with a computer software for performing the functions described in the present invention. The compiler 101 is used to compile a program to be executed by a processing unit, partition an instruction part of the compiled program into a plurality of instruction segments by means of jump instructions in the program, compress the plurality of instruction segments, and store the obtained compressed instruction segments in the central instruction memory 102.

The central instruction memory 102 can be a nonvolatile memory, such as a read only memory (ROM), a flash memory or the like, and is used to store the compressed instruction segments provided by the compiler 101.

Figure 2:
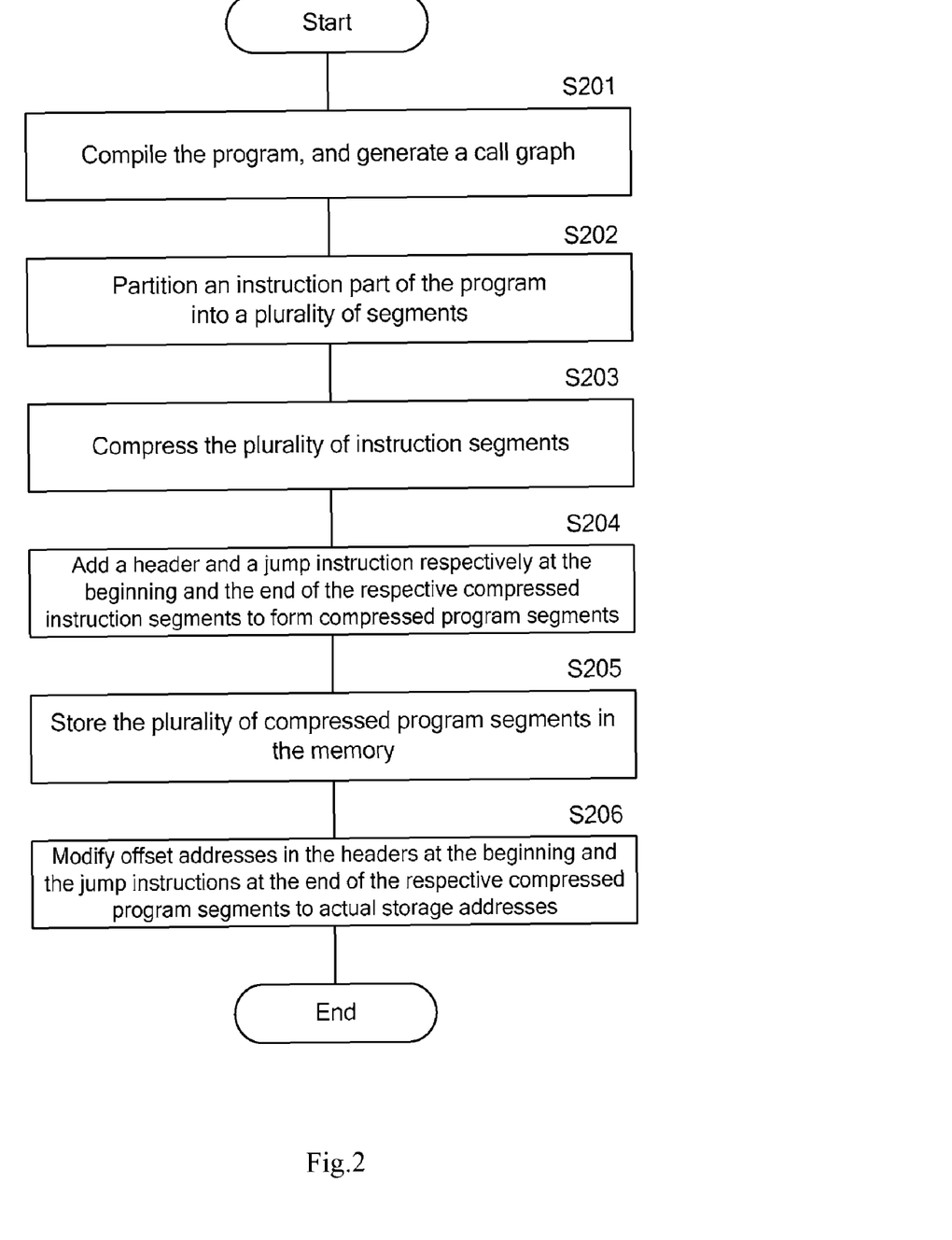
FIG. 2 is a flow diagram of a method for compressing and storing a program performed by the apparatus shown in FIG. 1 according to present invention.

The operations of the apparatus 100 will be described in detail below in conjunction with FIG. 1 and FIG. 2. FIG. 2 shows a flow diagram of a method for compressing and storing a program performed by the apparatus shown in FIG. 1 according to present invention.

Firstly, in step S201, the compiler 101 reads the program, and compiles the program using a well-known method in the art. In the compiling process, the compiler determines locations of jump instructions in the program, and generates a call graph indicating invoking relationships among respective functions (or instruction segments) in the program. The method by which the compiler generates the call graph is well known in the art, and the description of the method is omitted for the purpose of simplicity.

Next, the compiler 101 uses the jump instructions in the program as partitioning points to partition an instruction part of the compiled program into a plurality of instruction segments in step S202. Specifically, when finding a first jump instruction in the program, the compiler 101 partitions instructions before the jump instruction as an instruction segment. Then, when finding a next jump instruction, the compiler 101 partitions instructions between a previous jump instruction and the next jump instruction as a new instruction segment by using the next jump instruction as a new partitioning point. In this way, the compiler 101 partitions the instruction part of the program into the plurality of instruction segments by means of the jump instructions in the program.

However, in some program, a case in which there are a large number of jump instructions in a certain region of the program may occur, although this case occurs infrequently in the environment of media applications. At this time, if the compiler partitions the program by means of each found jump instruction, a large number of instruction segments may be obtained, many of which has small lengths, which will finally lead to a decrease of compression ratio of the whole program and a reduction of execution efficiency of the program. To solve this problem, the following method is preferably used to partition the program. After generating a call graph, the compiler 101 determines, based on the call graph, a jumping distance of each of the jump instructions in the program which may be a difference between memory offset addresses of the current jump instruction and a next jump instruction. Then, the compiler 101 compares the jumping distance of each of the jump instructions with a predetermined threshold. When the jumping distance of the jump instruction is smaller than the threshold, the compiler 101 does not partition the program using the instruction. When the jumping distance of the jump instruction is larger than or equal to the threshold, the compiler 101 partitions the program by using the jump instruction as a partition point. The threshold can be determined by a user according to an actual demand. For example, the user can determine the threshold according to factors, such as the total length of an executed program, the density of jump instructions in the program, the capacity of a memory available for storing the program, a program execution efficiency desired to obtain, and the like, so as to control the number and lengths of finally obtained instruction segments.

Besides partitioning a program using the above method, the program can also be partitioned by means of annotations in the program. Generally, when programming a program, a programmer will add a corresponding annotation at the beginning of each function to explain a function performed by the function and the like. The annotation includes, but is not limited to, a specific hint added at the beginning of the function. By recognizing these annotations, the compiler 101 can recognize respective functions and partition instructions composing these functions as instruction segments respectively by means of jump instructions at the end of the respective functions. In this way, since a whole function is partitioned as one instruction segment, the lengths of the instruction segments can be increased and the number of times of jumping can be reduced, thereby the compression ratio of the whole program is improved. However, when a program is partitioned using annotations, if the length of a function itself is long, a case in which the length of an obtained corresponding instruction segment is long may occur. At this time, the compiler 101 can further partition the instruction segment into a plurality of instruction segments based on jump instructions inside the function, so as to improve the execution efficiency.

As is well known in the art, when the compiler 101 compiles the program, addresses of respective instructions in the program offset sequentially from zero. Thus, after finishing the compiling, the compiler 101 can determine the offset addresses of the instructions in the program relative to the offset address of 0. Correspondingly, after partitioning the instruction part of the program into a plurality of instruction segments as described above, the compiler 101 can determine start offset addresses and end offset addresses of the respective instruction segments. At this time, the jumping addresses indicated by the jump instructions for partitioning the program in the program, i.e. the offset addresses of instruction segments to be invoked after the instruction segments before the instructions are also offset addresses relative to the offset address of 0.

Next, in step 203, the compiler 101 compresses the plurality of instruction segments using a compression algorithm optimized for a used hardware platform, and determines lengths of the respective compressed instruction segments. The hardware platform described herein means an instruction system of a multi-core processor, i.e. an instruction set architecture of the multi-core processor. Generally, different multi-core processors may have different instruction set architectures and different coding characteristics. Thus, using the compression algorithm optimized for the coding characteristic of the multi-core processor to compress the instruction segments can significantly improve the compression ratio of each of the instruction segment. The method of optimizing a compression algorithm for different multi-core processors and the optimized compression algorithms thus obtained are well known for those skilled in the art, and the description thereof is omitted herein for simplicity. It is to be noted that the jump instructions for partitioning the program are not compressed during the above compression process for the convenience of performing subsequent offset address adjusting due to the compression.

After compressing the instruction segments, the compiler 101 adds the respective jump instructions for partitioning the original program in the program to the end of corresponding compressed instruction segments respectively in step S204. In particular, as described above, the respective jump instructions for partitioning the program are not compressed when the respective instruction segments are compressed; and after finishing the compression, the compiler 101 adds a jump instruction which follows a certain instruction segment and is used for partitioning the program to the end of a compressed instruction segment corresponding to the certain instruction segment. At this time, the jumping address in the jump instruction is still the offset address of an instruction segment to be invoked after executing the instruction segment before being compressed. It is to be noted that an instruction segment to be jumped to which is indicated by a jump instruction added to the end of a compressed instruction segment is an instruction segment specified by a programmer using the jump instruction when programming the program.

After adding the jump instructions, the compiler 101 predicts instruction segments which may be invoked (or jumped to) after the processing unit executes the respective instruction segments according to the invoking relationships among the respective instruction segments shown in the generated call graph, and determines the offset addresses of the predicted instruction segments before being compressed. The method by which the compiler 101 predicts the instruction segment to be invoked after one instruction segment is executed is well known in the art, and thus the prediction method is not described here for simplicity. Then, the compiler 101 adds a header having a predetermined format and size at the beginning of each of the compressed instruction segments, and the header comprises a data bit (bits) indicating the length of the each of the (current) compressed instruction segments, a data bit (bits) indicating the offset address of the current instruction segment (before being compressed), and a data bit (bits) indicating the offset address of the instruction segment to be invoked after the current instruction segment is executed (before being compressed), wherein the offset address of the current instruction segment (before being compressed) refers to the offset address of the original instruction segment corresponding to the current compressed instruction segment relative to the offset address of 0 before being compressed, and the instruction segment to be invoked after the current instruction segment is executed is the instruction segment to be invoked which is predicted by the compiler 101 according to the call graph as described above. It is to be appreciated that those skilled in the art can choose the format and size of the header according to an actual demand.

After the processing described above, a plurality of compressed program segments are formed, each of which includes a compressed instruction segment, a header at the beginning of the compressed instruction segment, and a jump instruction at the end of the compressed instruction segment. It is to be appreciated that the order of the step of adding the jump instruction and the step of adding the header is only illustrative, and the header can be added first and then the jump instruction is added.

Since the respective instruction segments vary in their lengths after being compressed, relevant offset addresses in the headers and the jump instructions must be adjusted subsequently according to the variation amount between the lengths of the instruction segments before and after the compression. To this end, the compiler 101 sets the start offset address of a first compressed program segment to 0, and then calculates the start offset addresses of the respective compressed program segments sequentially according to the lengths of the respective compressed program segments (comprising the headers at their beginning and the jump instructions at their end). Since the lengths of the headers, the jump instructions and the compressed instruction segments in the compressed program segments are known, the lengths of the compressed program segments are also known. By way of an example, if the compressed program segments are stored in an order from a low address to a high address, the start offset address of a second compressed program segment is 0 plus the length of the first compressed program segment, since the start offset address of the first compressed program segment is 0. Also, the start offset address of a third compressed program segment is the start offset address of the second compressed program segment plus the length of the second compressed program segment. In this way, the compiler 101 can sequentially calculate the start offset addresses of the respective compressed segments relative to the offset address of 0. Then, the compiler 101 can sequentially calculate the start offset addresses of the compressed instruction segments in the respective compressed program segments relative to the offset address of 0.

Subsequently, the compiler 101 calculates the variation amount between the offset addresses of the respective instruction segments before and after the compression according to the offset addresses of the respective compressed instruction segments before being compressed and the calculated offset addresses of the respective compressed instruction segments.

Then, the compiler 101 modifies the jumping addresses in the jump instructions respectively added at the end of the compressed program segments (i.e. the offset addresses of the instruction segments to be jumped to) to the calculated offset addresses of the compressed program segment corresponding to the instruction segments after the compression, and modifies the offset addresses of the current instructions and the offset addresses of the instruction segments to be jumped to in the headers respectively to the calculated offset addresses of the current compressed instruction segments and the calculated offset addresses of the compressed program segments corresponding to the instruction segments to be jumped to.

Next, the compiler 101 stores the plurality of compressed program segments sequentially in the central instruction memory 102 in step S205. Then, in step S206, the compiler 101 determines the actual offset address of the first compressed program segment in the central instruction memory 102, calculates the variation amount between the offset addresses of the first compressed program segment before and after being stored, and modifies the respective offset addresses in the headers at the beginning and the jump instructions at the end of the respective compressed program segments correspondingly according to the variation amount, so that the respective offset addresses indicate actual storage addresses in the central instruction memory 102. Then, the process for compressing and storing the program is terminated.

After the above process, the program is stored in the central instruction memory 102 in the form of compressed program segments, wherein there is a jump instruction at the end of each of the compressed program segments, and the jump instruction includes a storage address of a compressed program segment in the central instruction memory 102, the compressed program segment corresponding to an instruction segment specified by the programmer using the jump instruction when programming the program; moreover, there is a header at the beginning of the each of the compressed program segments, and the header includes a length of a compressed instruction segment, i.e. a current compressed instruction segment, in the each of the compressed program segments, a storage address of the current compressed instruction segment in the central instruction memory 102, and a storage address of a compressed program segment in the central instruction memory 102, the compressed program segment corresponding to an instruction segment to be invoked which is predicted by the compiler based on the invoking relationships in the program.

Figure 3:
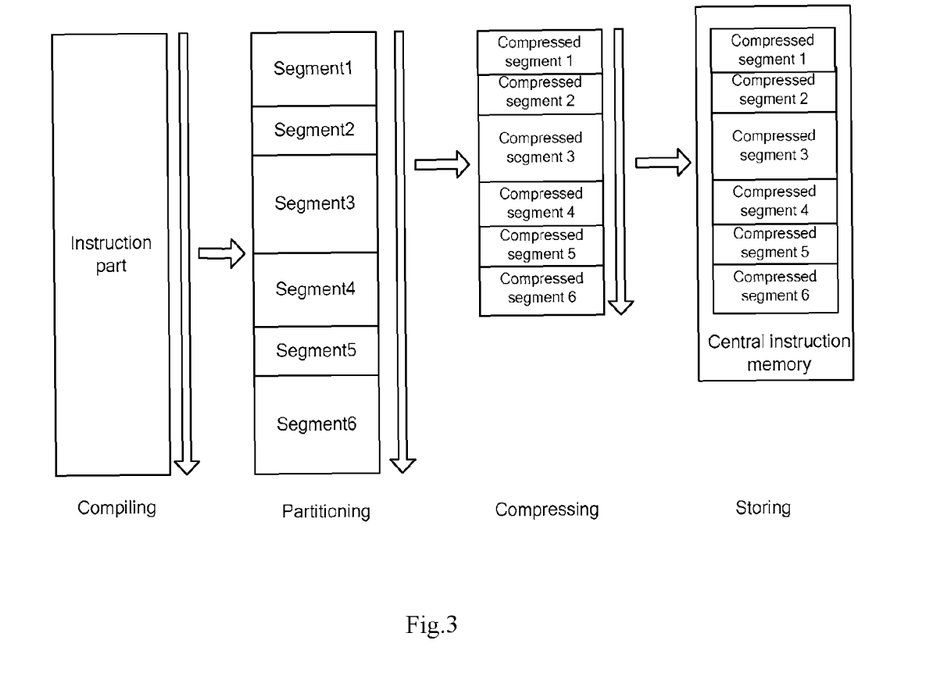
FIG. 3 schematically shows processing results of respective phases when a program is processed using the apparatus shown in FIG. 1 according to the present invention.

FIG. 3 schematically shows processing results of respective phases when a program is processed using the apparatus shown in FIG. 1 according to the present invention. As shown in FIG. 3, the apparatus and method for compressing and storing the program according to the present invention efficiently reduce the storage space required for storing the program.

Additionally, it is to be understood by those skilled in the art that, although a single means, i.e. the compiler, is used to partition, compress and store a program hereinbefore, this is only for an illustrative purposes, but not limitative. In fact, besides the single compiler, a plurality of modules can be used to implement the above functions. For example, an apparatus comprising a compiling means, a partitioning means and a compressing means can be used to implement the same functions in a manner similar to that described above, wherein the compiling means compiles a program, generates a call graph and records information necessary for partitioning the program; the partitioning means partitions the program into a plurality of instruction segments according to the information provided by the compiling means; the compressing means compresses the respective instruction segments; and then, similarly, the compiling means adds a header and a jump instruction as described above at the beginning and the end of each of the instruction segments respectively. Of course, those skilled in the art can employ other means having the above respective functions and/or a combination thereof according to an actual demand, as long as the means and/or the combination thereof can implement the above functions.

Next, an overlay instruction accessing unit and an overlay instruction accessing method according to the invention will be described with reference to the figures.

Figure 4:
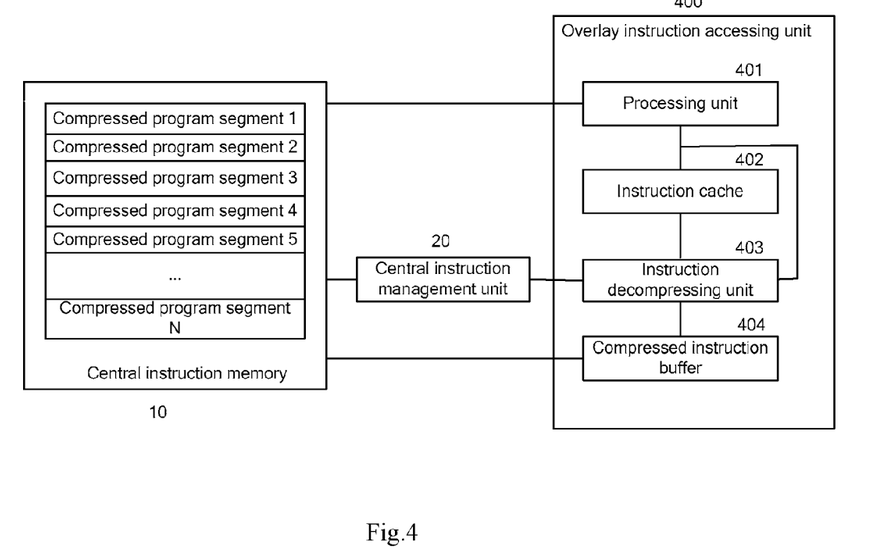
FIG. 4 is a block diagram of an overlay instruction accessing unit according to the present invention.

FIG. 4 shows a block diagram of an overlay instruction accessing unit for reading and executing compressed program segments stored as described above according to an embodiment of the present invention.

As described in FIG. 4, the overlay instruction accessing unit 400 comprises a processing unit 401, an instruction cache 402 for the processing unit 401, an instruction decompressing unit 403, and a compressed instruction buffer 404 for the instruction decompressing unit 403. The instruction decompressing unit 403 in the overlay instruction accessing unit 400 is connected to a central instruction memory 10 via a central instruction management unit 20.

The central instruction memory 10 can be a nonvolatile memory, such as a read only memory (ROM), a flash memory and the like, and stores therein a program to be executed by the processing unit 401 in the central instruction memory 10, similarly to the central instruction memory 102 described with respect to FIG. 1 hereinbefore. The program is stored in the form of compressed program segments, and the compressed program segments are obtained by partitioning and compressing the program by the apparatus shown in FIG. 1 according to the method shown in FIG. 2. As described above, each of the compressed program segments includes a header at the beginning, a compressed program segment, and a jump instruction at the end. The header includes a length of the compressed instruction, i.e. a current compressed instruction segment, in the each of the compressed instruction segment, a storage address of the current compressed program segment in the central instruction memory 10, and a storage address of a compressed instruction segment in the central instruction memory 10, the compressed program segment corresponding to an instruction segment to be invoked which is predicted by the compiler based on invoking relationships in the program. Further, the jump instruction at the end indicates a storage address of a compressed program segment in the central instruction memory 10, the compressed program segment corresponding to an instruction segment to be jumped to which is specified by the programmer using the jump instruction when programming the program.

The processing unit 401 may be a processing unit of a multi-core processor, and may also be an independent processor, which executes a program for media applications, for example.

The instruction cache 402 is used to store instructions to be executed by the processing unit, and may be constituted by a volatile memory, such as a static random access memory (SRAM).

The instruction decompressing unit 403 is used to read a header of a requested compressed program segment from the central instruction memory 10 in response to an instruction reading request issued by the processing unit when executing the program and thereby read a compressed instruction segment in the compressed program segment, decompress the compressed instruction segment, and store the decompressed instruction segment in the instruction cache 402 for use by the processing unit 401. In order to improve the execution efficiency, while the processing unit 401 is executing a current instruction segment, the instruction decompressing unit 403 reads a next compressed instruction segment to be invoked after the current instruction segment is executed from the central instruction memory 10 in advance according to the header, decompresses the read compressed instruction segment, and then stores the decompressed instruction segment in the instruction cache 402 for later use by the processing unit 401.

The compressed instruction buffer 404 is used to store temporarily the header and the compressed instruction segment read from the central instruction memory 10 by the instruction decompressing unit 403, and temporary data during the decompression of the compressed instruction segment performed by the decompressing unit 403.

The central instruction management unit 20 is used to read a requested header or compressed instruction segment from the central instruction memory 10 in response to a request of the instruction decompressing unit 403, and transfer the read header or compressed instruction segment to the compressed instruction buffer 404.

In the case of a Single Program Multiple Data (SPMD) application based on a multi-core architecture, the central instruction memory 10 and the central instruction management unit 20 can be shared by multiple processing units executing a same program simultaneously in multiple overlay instruction accessing units. That is, the program executed by the multiple processing units simultaneously is stored in the central instruction memory 10 in the form of compressed program segments as described above, and these processing units can read the respective compressed program segments independently during execution. Since structures and operations of the respective overlay instruction accessing units to which the respective processing units belong are similar to each other, the operations of only one overlay instruction accessing unit will be described hereinafter.

When the system starts up, the processing unit 401 issues to the instruction cache 402 an instruction reading request including a header address of a first compressed program segment of the program. Then, the processing unit 401 enters a stalling state to wait for the requested instructions.

The instruction decompressing unit 403 intercepts the request, pauses an operation currently being executed (if any), and stores a context related to the operation. Then, the instruction decompressing unit 403 issues, according to the header address in the request, a request for reading the header to the central instruction management unit 20. The central instruction management unit 20 reads the header from the central instruction memory 10 in response to the request, and sends the header to the compressed instruction buffer 404. The instruction decompressing unit 403 reads the header from the compressed instruction buffer 404, and judges, according to a storage address of a current compressed instruction segment included in the header, whether the requested compressed instruction segment has been present in the instruction cache 402 and whether it has been decompressed completely.

If the instruction decompressing unit 403 determines that the requested compressed instruction segment has been present in the instruction cache 402 and has been decompressed, the instruction decompressing unit 403 sends an instruction ready signal to the processing unit 401. The processing unit 401 receives this signal and reads the instruction segment from the instruction cache 402 to execute.

If the instruction decompressing unit 403 determines that the requested compressed instruction segment has been present in the instruction cache 402 but is being decompressed by the unit, the instruction decompressing unit 403 resumes the decompression of the instruction segment, and sends the instruction ready signal to the processing unit 401 after completing the decompression. The processing unit 401 receives this signal and reads the decompressed instruction segment from the instruction cache 402 to execute.

Since the system just starts up and a first compressed instruction segment has not been read into the instruction cache 402 yet at this time, as a third case, the instruction decompressing unit 403 finds that the requested compressed instruction segment is not in the instruction cache 402. Then, the instruction decompressing unit 403 issues a request for reading the compressed instruction segment to the central instruction management unit 20, and sends in the request the storage address of the first compressed instruction segment included in the header to the central instruction management unit 20. The central instruction management unit 20 reads the compressed instruction segment at the storage address and a jump instruction at its end from the central instruction memory 10 in response to the request, and sends the read compressed instruction segment and the jump instruction at its end to the compressed instruction buffer 404.

Next, the instruction decompressing unit 403 reads the compressed instruction segment from the compressed instruction buffer 404, decompresses the compressed instruction segment, and stores the decompressed instruction segment and the jump instruction at its end in the instruction cache 402. Then, the instruction decompressing unit 403 sends the instruction ready signal to the processing unit 401. The processing unit 401 receives the signal, jumps out of the stalling state, and reads and executes the instructions stored in the instruction cache 402.

While the processing unit 401 is executing the instruction segment, the decompressing unit 403 reads a storage address of a next compressed program segment to be jumped to included in the header corresponding to the instruction segment, and reads a header of the next compressed program segment in the same manner as above through the central instruction management unit 404. Next, the decompressing unit 403 reads a compressed instruction segment in the next compressed program segment and a jump instruction at its end from the central instruction memory 10 to the compressed instruction buffer 404 through the central instruction management unit 20 according to a storage address of the compressed instruction segment in the next compressed program segment included in the header, decompresses the compressed instruction segment, and stores the decompressed instruction segment and the jump instruction in the instruction cache 402 for later use by the processing unit.

When finishing the execution of the first instruction segment, the processing unit 401 issues an instruction reading request to the instruction cache 402 again according to the jump instruction at the end of the executed instruction segment, so as to request to read subsequent instructions. Then, the processing unit 401 enters the stalling state again to wait for the requested instructions.

The instruction decompressing unit 403 intercepts the request, pauses an operation currently executed (if any), and stores a context related to the operation. Then, the instruction decompressing unit 403 checks whether the requested compressed instruction segment has been present in the instruction cache 402 in a manner similar to that described above. When the instruction segment to be invoked which is predicted by the compiler according to the call graph is the same as the instruction segment to be executed next by the processing unit 401, the requested instruction segment is the one decompressed by the decompressing unit 403 in advance according to the header, which means that the decompressing unit 403 has read the requested compressed instruction segment. At this time, the decompressing unit 403 determines whether the requested compressed instruction segment has been decompressed completely. If the requested compressed instruction segment has been decompressed completely and thus stored in the instruction cache 402, the instruction decompressing unit 403 sends the instruction ready signal to the processing unit 401 to restart the processing unit 401, and the processing unit 401 receives the signal, jumps out of the stalling state, and reads the requested instruction segment from the instruction cache 402 to execute. Conversely, if the requested compressed instruction segment has not been decompressed completely but is in the process of being decompressed, the instruction decompressing unit 403 resumes the decompression operation on the instruction segment so as to continue to decompress the program segment, and sends the instruction ready signal to the processing unit 401 when finishing the decompression to restart the processing unit 401.

On the other hand, if the instruction segment to be invoked which is predicted by the compiler according to the call graph is different from the instruction segment to be executed next by the processing unit 401, this means that the instruction segment read and decompressed by the instruction decompressing unit 403 in advance is not the instruction segment requested by the processing unit 401. Thus, the instruction decompressing unit 403 finds that the requested instruction segment is not in the instruction cache 402. Then, according to the storage address of the compressed program segment to be invoked included in the request issued by the processing unit 401, the instruction decompressing unit 403 reads a header of the requested compressed instruction and a corresponding compressed instruction segment from the central instruction memory 10 through the central instruction management unit 20 in the same manner as above, decompresses the compressed instruction segment, and stores the decompressed instruction segment in the instruction cache 402 for use by the processing unit 402. Then, likewise, the instruction decompressing unit 403 sends the instruction ready signal to the processing unit 401 to start the processing unit 401. The processing unit 401 receives the signal, jumps out of the stalling state, reads the program segment from the instruction cache 402 and executes the program segment.

The overlay instruction accessing unit according to the present invention repeats the above process for all of the compressed program segments of the program to be executed, until all instructions are processed.

It is to be noted that, after executing the instructions stored in the instruction cache, the processing unit may delete the instructions from the instruction cache, so as to leave a storage space for subsequent instructions in advance and thus improve the utilization efficiency of the instruction cache.

An overlay instruction accessing method according to the present invention will be described below in conjunction with FIG. 4 and FIG. 5.

Figure 5:
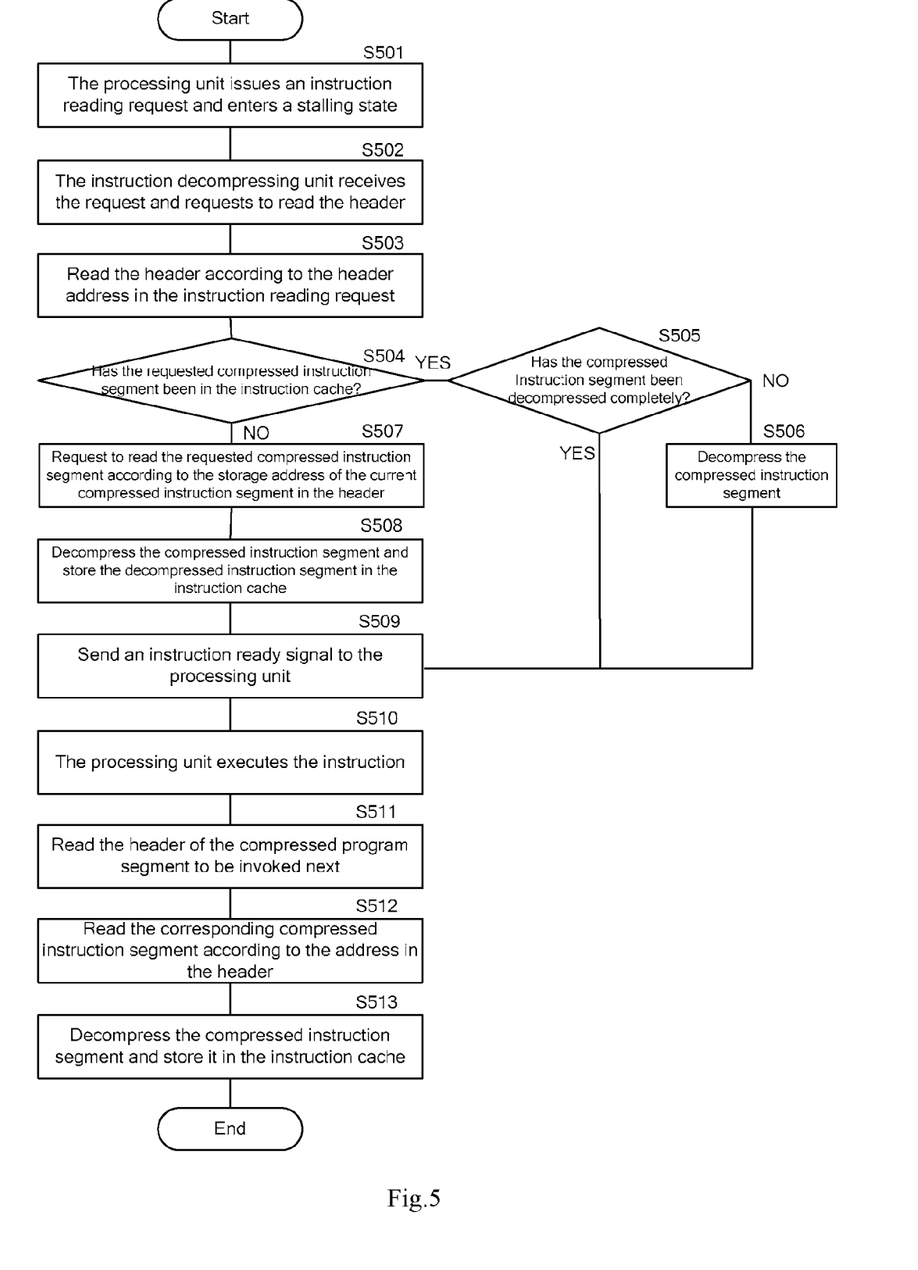
FIG. 5 is a flow diagram of an overlay instruction accessing method performed by the overlay instruction accessing unit shown in FIG. 4 according to the present invention.

FIG. 5 shows a flow diagram of an overlay instruction accessing method performed by the overlay instruction accessing unit shown in FIG. 4 according to the present invention.

As shown in FIG. 5, in step S501, the system starts up, and the processing unit 401 issues to the instruction cache 402 an instruction reading request including a header address of a first compressed program segment of the program. Then, the processing unit 401 enters a stalling state to wait for the requested instructions.

In step S502, the instruction decompressing unit 403 intercepts the request, pauses an operation currently executed (if any) and stores a context related to the operation, and sends, according to the header address in the request, a request for reading the header to the central instruction management unit 20. The central instruction management unit 20 reads the header from the central instruction memory 10 in response to the request, and sends the header to the compressed instruction buffer 404. Then, the instruction decompressing unit 403 reads the header from the compressed instruction buffer 404 in step S503, and judges, according to a storage address of a current compressed instruction segment included in the header, whether the requested compressed instruction segment has been present in the instruction cache 402 in step S504.

If it is determined that the requested compressed instruction segment has been in the instruction cache 402 in step S504, the process proceeds to step S505 in which the instruction decompressing segment 403 determines whether the compressed instruction segment has been decompressed completely. If it is determined in step S505 that the decompressed instruction segment has been decompressed, the process proceeds to step S509 in which the instruction decompressing unit 403 sends the instruction ready signal to the processing unit 401 to restart the processing unit. Conversely, if it is determined in step S505 that the compressed instruction segment has not been decompressed completely but is in the process of being decompressed, the instruction decompressing unit 403 resumes the operation paused previously in step S506, i.e. continues to decompress the compressed instruction segment, and sends the instruction ready signal to the processing unit 401 in step S509 after finishing the decompression.

On the other hand, if the instruction decompressing unit 403 finds that the requested instruction segment is not in the instruction cache 402 (which is applicable to the above case in which the system just starts up, since the first compressed instruction segment is not read into the instruction cache 402 at this time), the instruction decompressing unit 403 issues a request for reading the compressed instruction segment to the central instruction management unit 20 in step S507, and sends in the request the storage address of the compressed instruction segment included in the header to the central instruction management 20. The central instruction management unit 20 reads the compressed instruction segment at the storage address and the jump instruction at its end from the central instruction memory 10 in response to the request, and sends the read compressed instruction segment and the jump instruction to the compressed instruction buffer 404.

Next, in step S508, the instruction decompressing unit 403 reads the compressed instruction segment from the compressed instruction buffer 404, decompresses the compressed instruction segment, and stores the decompressed instruction segment and the jump instruction at its end in the instruction cache 402. Then, the instruction decompressing unit 403 sends the instruction ready signal to the processing unit 401 in step S509. In step S510, the processing unit 401 receives the signal, jumps out of the stalling state, reads and executes the instructions stored in the instruction cache 402.

While the processing unit 401 is executing the instruction segment, in step S511, the decompressing unit 403 reads a storage address of a compressed program segment to be invoked next included in the header corresponding to the instruction segment, and then reads a header of the compressed program segment to be invoked next in the same manner as above through the central instruction management unit 20. Next, in step S512, the decompressing unit 403 reads, according to a storage address of a corresponding compressed instruction segment included in the header, the compressed instruction segment and a jump instruction at its end from the central instruction memory 10 to the compressed instruction buffer 404 through the central instruction management 20. Then, in step S513, the decompressing unit decompresses the compressed instruction segment, and stores the decompressed instruction segment and the jump instruction in the instruction cache 402 for later use by the processing unit 401.

When the processing unit 401 completes the execution of the instruction segment, the processing unit 401 will issue an instruction read request to the instruction cache 402 again according to the jump instruction at the end of the executed instruction segment, so as to request for reading subsequent instructions. When receiving the instruction reading request, the instruction decompressing unit 403 will execute the above operations again.

In particular, when receiving the instruction reading request, the instruction decompressing unit 403 pauses an operation currently executed (if any), and stores a context related to the operation. Then, the instruction decompressing unit 403 checks whether the requested compressed instruction segment has been present in the instruction cache 402. When the instruction segment to be invoked which is predicted previously by the compiler according to the call graph is the same as the instruction segment to be executed next by the processing unit 401, the requested instruction segment is just the instruction segment decompressed in advance by the decompressing unit 403 according to the header, which means that the decompressing unit 403 has read the requested compressed instruction segment. At this time, the decompressing unit 403 determines whether the requested compressed instruction segment has been decompressed completely. If the requested instruction segment has been decompressed completely, the instruction decompressing unit 403 sends the instruction ready signal to the processing unit 401, and the processing unit 401 receives the signal, jumps out of the stalling state, reads the requested instruction segment from the instruction cache 402, and executes the requested instruction segment. Conversely, if the requested compressed instruction segment is being decompressed, the instruction decompressing unit 403 continues to decompress the instruction segment, and sends the instruction ready signal to the processing unit 401 when finishing the decompression to restart the processing unit 401.

On the other hand, if the instruction segment to be invoked which is predicted previously by the compiler according to the call graph is different from the instruction segment to be executed next by the processing unit 401, this means that the instruction segment read and decompressed by the instruction decompressing unit 403 in advance is not the instruction segment requested by the processing unit 401, i.e. the requested instruction segment is not in the instruction cache 402. Thus, according to the storage address of the compressed program segment to be invoked included in the request issued by the processing unit 401, the instruction decompressing unit 403 reads a header of the requested compressed program segment and a corresponding compressed instruction segment from the central instruction memory 10 through the central instruction management unit 20 as described above, decompresses the compressed instruction segment, and stores the decompressed instruction segment in the instruction cache 402. Then, the instruction decompressing unit 403 issues the instruction ready signal to the processing unit 401 to start the processing unit 401. The processing unit 401 receives the signal, jumps out of the stalling state, reads the program segment from the instruction cache 402, and executes the program segment.

The above process is repeated for all of the compressed instruction segments of the program to be executed, until all instructions are processed.

Figure 6:
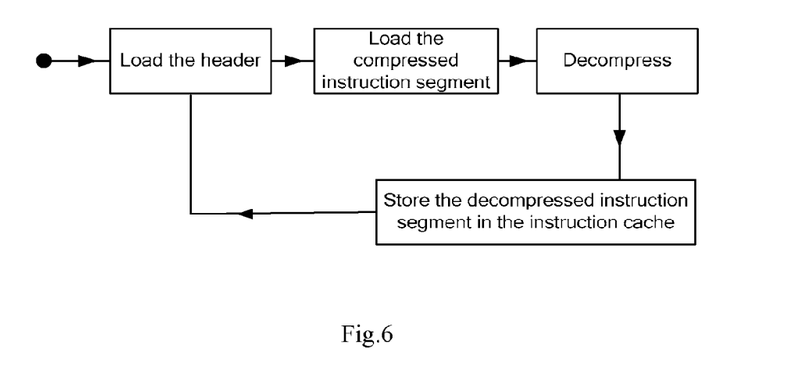
FIG. 6 is a data flow diagram of the overlay instruction accessing method according to the present invention.

As described above, in the overlay instruction accessing method according to the present invention, the process for the processing unit to execute the program and the process for the decompressing unit to decompress the instruction segment to be invoked next are overlapped, thus the execution efficiency is improved. FIG. 6 is a schematic data flow diagram of the overlay instruction accessing method according to the present invention, which shows clearly the overlapping characteristic of the present invention.

For a Single Program Multiple Data (SPMD) application based on a multi-core architecture, multiple processing units of the multi-core processor can share the central instruction memory. In this case, it is unnecessary to provide an individual instruction memory for each of the processing units, instead, only a much smaller instruction buffer is needed to be provided to each of the processing units. Thus, the memory capacity required by the whole multi-core processor is significantly reduced. For example, a multi-core processor having four processing units generally requires four instruction memories of 32 KB (128 KB in all); in contrast, when applied the present invention, it only requires one instruction memory of 32 KB and four instruction buffers of 1 KB (36 KB in all). Therefore, a memory requirement of 96 KB is reduced and the system cost is decreased. Furthermore, since a program is stored after being partitioned and compressed, longer programs can be supported by the method and apparatus according to the present invention.

Although some exemplary embodiments of the present invention have been shown and described, those skilled in the art should understand that various changes in form and details can be made to the exemplary embodiments without departing from the scope and spirit of the present invention as defined in the following claims and equivalents.

What is claimed is:

1. A method for compressing and storing a program, comprising the steps of:
    compiling the program;
    partitioning an instruction part of the compiled program into a plurality of instruction segments by means of a jump instruction in the program;
    compressing the plurality of instruction segments to obtain a plurality of compressed instruction segments; and
    storing the plurality of compressed instruction segments in a memory.

2. The method of claim 1, wherein in the partitioning step, a function in the program is recognized by recognizing an annotation at the beginning of the function, and the instruction part is partitioned by means of a jump instruction at the end of the function.

3. The method of claim 1, wherein in the partitioning step, the instruction part is partitioned by means of each jump instruction in the compiled program.

4. The method of claim 1, wherein in the partitioning step, a jumping distance of each jump instruction in the compiled program is determined, and the instruction part is partitioned by means of the jump instruction when the jumping distance of the jump instruction exceeds a predetermined threshold.

5. The method of claim 1, wherein in the compressing step, the plurality of instruction segments are compressed using a compression algorithm optimized for a used hardware platform.

6. The method of claim 1, further comprising:
    adding a header and the jump instruction respectively at the beginning and the end of each of the plurality of compressed instruction segments to form a plurality of corresponding compressed program segments, wherein the header includes a storage address in the memory of a compressed program segment to be invoked next which is predicted based on invoking relationships in the program, a length of the each of the compressed instruction segments, and a storage address in the memory of the each of the compressed instruction segments, and the jump instruction includes a storage address in the memory of a compressed program segment corresponding to an instruction segment to be invoked next which is specified using the jump instruction when the program is programmed.

7. The method of claim 6, wherein in the compiling step, a call graph of the function is generated, and wherein the compressed program segment to be invoked next which is indicated in the header is predicted using the invoking relationships represented by the call graph.

8. An apparatus for compressing and storing a program, comprising:
    a compiler for compiling the program, partitioning an instruction part of the compiled program into a plurality of instruction segments by means of a jump instruction in the program, and compressing the plurality of instruction segments to obtain a plurality of compressed instruction segments; and
    a memory for storing the plurality of compressed instruction segments.

9. The apparatus of claim 8, wherein the compiler recognizes a function in the program by recognizing an annotation at the beginning of the function, and partitions the instruction part by means of a jump instruction at the end of the function.

10. The apparatus of claim 8, wherein the compiler partitions the instruction part by means of each jump instruction in the compiled program.

11. The apparatus of claim 8, wherein the compiler determines a jumping distance of each jump instruction in the compiled program, and partitions the instruction part by means of the jump instruction when the jumping distance of the jump instruction exceeds a predetermined threshold.

12. The apparatus of claim 8, wherein the compiler compresses the plurality of instruction segments using a compression algorithm optimized for a used hardware platform.

13. The apparatus of claim 8, wherein the compiler adds a header and the jump instruction respectively at the beginning and the end of each of the plurality of compressed instruction segments to form a plurality of corresponding compressed program segments, wherein the header includes a storage address in the memory of a compressed program segment to be invoked next which is predicted by the compiler based on invoking relationships in the program, a length of the each of the compressed instruction segments, and a storage address in the memory of the each of the compressed instruction segments, and the jump instruction includes a storage address in the memory of a compressed program segment corresponding to an instruction segment to be invoked next which is specified using the jump instruction when the program is programmed.

14. The apparatus of claim 13, wherein the compiler generates a call graph of the function when compiling the program, and predicts the compressed program segment to be invoked next which is indicated in the header by the invoking relationships represented by the call graph.

15. An overlay instruction accessing method executed by an overlay instruction accessing unit comprising a processing unit, a buffer and a decompressing unit, for reading and executing a program stored in a memory in the form of a plurality of compressed program segments, wherein each of the compressed program segments includes a header at its beginning, a compressed instruction segment, and a jump instruction at its end, the header includes a storage address of a compressed program segment to be invoked next which is predicted based on invoking relationships in the program and a storage address of the compressed instruction segment, and the jump instruction includes a storage address of a compressed program segment to be invoked next which is specified when the program is programmed, the overlay instruction accessing method comprising the steps of:

issuing an instruction reading request by the processing unit;

reading a requested compressed instruction segment from the memory by the decompressing unit in response to the instruction reading request, decompressing the requested compressed instruction segment, and storing the decompressed instruction segment in the buffer; and reading from the buffer and executing the instruction segment by the processing unit, wherein while the processing unit is executing the instruction segment, the decompressing unit reads, according to a storage address of a compressed program segment to be invoked in a header corresponding to the instruction segment, a corresponding compressed instruction segment from the memory, decompresses the compressed instruction segment, and stores the decompressed instruction segment in the buffer.

16. The overlay instruction accessing method of claim 15, wherein the instruction reading request includes a storage address of a header corresponding to the compressed instruction segment to be read, and wherein the decompressing unit reads the header from the memory according to the storage address of the header, and reads, according to a storage address of the corresponding compressed instruction segment included in the header, the compressed instruction segment from the memory.

17. The overlay instruction accessing method of claim 15, further comprising the step of checking whether the requested instruction segment has been in the buffer and whether it has been decompressed completely by the decompressing unit when receiving the instruction reading request.

18. The overlay instruction accessing method of claim 17, wherein:

when the requested compressed instruction segment has been in the buffer and has been decompressed completely, the decompressing unit sends a signal to the processing unit to start the processing unit;

when the requested compressed instruction segment has been in the buffer but has not been decompressed completely, the decompressing unit continues to decompress the instruction segment, and sends the signal to the processing unit to start the processing unit after finishing the decompression; and when the requested compressed instruction segment is not in the buffer, the decompressing unit reads the requested instruction segment from the memory according to the instruction reading request, decompresses the requested instruction segment and stores it in the buffer.

19. The overlay instruction accessing method of claim 15, wherein the memory is shared by a plurality of overlay instruction accessing units.

20. An overlay instruction accessing unit for reading and executing a program stored in a memory in the form of a plurality of compressed program segments, wherein each of the compressed program segments includes a header at its beginning, a compressed instruction segment, and a jump instruction at its end, the header includes a storage address of a compressed program segment to be invoked next which is predicted based on invoking relationships in the program and a storage address of the compressed instruction segment, and the jump instruction includes a storage address of a compressed program segment to be invoked next which is specified when the program is programmed, the overlay instruction accessing unit comprising:

a buffer;

a processing unit for sending an instruction reading request, reading an instruction from the buffer, and executing the instruction; and a decompressing unit for reading a requested compressed instruction segment from the memory in response to the instruction reading request sent by the processing unit, decompressing the compressed instruction segment, and storing the decompressed instruction segment in the buffer for execution by the processing unit, wherein while the processing unit is executing the instruction segment, the decompressing unit reads, according to a storage address of a compressed program segment to be invoked in a header corresponding to the instruction segment, a corresponding compressed instruction segment from the memory, decompresses the compressed instruction segment, and stores the decompressed instruction segment in the buffer.

21. The overlay instruction accessing unit of claim 20, wherein the instruction reading request includes a storage address of a header corresponding to the compressed instruction segment to be read, and the decompressing unit reads the header from the memory according to the storage address of the header, and reads, according to a storage address of the corresponding compressed instruction segment included in the header, the compressed instruction segment from the memory.

22. The overlay instruction accessing unit of claim 20, wherein the decompressing unit checks whether the requested instruction segment has been in the buffer and whether it has been decompressed completely when receiving the instruction reading request.

23. The overlay instruction accessing unit of claim 22, wherein:

when the requested compressed instruction segment has been in the buffer and has been decompressed completely, the decompressing unit sends a signal to the processing unit to start the processing unit;

when the requested compressed instruction segment has been in the buffer but has not been decompressed completely, the decompressing unit continues to decompress the instruction segment, and sends the signal to the processing unit to start the processing unit after finishing the decompression; and when the requested compressed instruction segment is not in the buffer, the decompressing unit reads the requested instruction segment from the memory according to the instruction reading request, decompresses the requested instruction segment and stores it in the buffer.

24. The overlay instruction accessing unit of claim 20, wherein the memory is shared by a plurality of overlay instruction accessing units.

* * * * *